US010577774B2

(12) United States Patent
Hoyt et al.

(10) Patent No.: US 10,577,774 B2
(45) Date of Patent: Mar. 3, 2020

(54) TRUNNION AND SOCKET ASSEMBLY

(71) Applicant: Caterpillar Inc., Peoria, IL (US)

(72) Inventors: Daniel W. Hoyt, Brimfield, IL (US);
Uday Kasturi, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 284 days.

(21) Appl. No.: 15/169,061

(22) Filed: May 31, 2016

(65) Prior Publication Data

US 2016/0273187 A1 Sep. 22, 2016

(51) Int. Cl.
*F16B 7/10* (2006.01)
*F16D 1/12* (2006.01)
*F16D 3/00* (2006.01)
*E02F 3/80* (2006.01)
*F16C 11/06* (2006.01)
*E02F 9/00* (2006.01)
*E02F 3/76* (2006.01)

(52) U.S. Cl.
CPC ............. *E02F 3/80* (2013.01); *E02F 9/006* (2013.01); *F16C 11/069* (2013.01); *E02F 3/7622* (2013.01); *F16C 11/0623* (2013.01); *F16C 2350/26* (2013.01); *Y10T 403/32122* (2015.01)

(58) Field of Classification Search
CPC . E02F 3/80; E02F 3/7622; F16C 11/02; F16C 11/06; F16C 11/0623; F16C 11/069; F16C 2350/26; F16C 9/006; Y10T 403/32122; Y10T 403/32311; Y10T 403/32573; Y10T 403/32631; Y10T 403/32647; Y10T 403/32655; Y10T 403/32672; Y10T 403/32713; Y10T 403/32721; Y10T 403/32729; Y10T 403/32737; Y10T 403/32745; Y10T 403/32795; Y10T 403/32803; B60G 7/005
USPC ... 403/67, 90, 115, 122, 124, 125, 126, 132, 403/133, 134, 135, 137, 142, 143
See application file for complete search history.

(56) References Cited

U.S. PATENT DOCUMENTS

| | | | |
|---|---|---|---|
| 1,700,311 A * | 1/1929 | Fender | B65G 53/52 |
| | | | 285/264 |
| 3,791,457 A | 2/1974 | Hanser et al. | |
| 3,907,383 A | 9/1975 | Shelby | |
| 3,922,040 A | 11/1975 | Carter | |
| 4,011,670 A | 3/1977 | Hutchings et al. | |
| 4,031,967 A * | 6/1977 | Atherton | E02F 3/764 |
| | | | 172/795 |
| 6,345,926 B1 | 2/2002 | Farnam et al. | |

(Continued)

*Primary Examiner* — Jonathan P Masinick
(74) *Attorney, Agent, or Firm* — Bookoff McAndrews

(57) ABSTRACT

A trunnion and socket assembly is provided. The trunnion and socket assembly includes a trunnion, a socket, and a retention assembly. The trunnion includes a first portion and a second portion, the second portion defining an outer diameter. The retention assembly includes at least two cap elements and a ring member. The cap elements are coupled in an abutting relationship with a first surface of the socket. The cap elements have a second surface and a third surface. The ring member is adapted to be coupled in an abutting relationship with the third surface of each of the cap elements. The ring member has a fourth surface and a fifth surface. The ring member defines an inner diameter that is greater than the outer diameter of the second portion of the trunnion.

20 Claims, 5 Drawing Sheets

(56) References Cited

U.S. PATENT DOCUMENTS

| | | | | |
|---|---|---|---|---|
| 6,409,388 | B1* | 6/2002 | Lin | B60B 33/08 |
| | | | | 16/29 |
| 6,641,323 | B2* | 11/2003 | Ronsheim | F16C 11/106 |
| | | | | 269/25 |
| 7,281,693 | B2* | 10/2007 | Chou | F16M 11/14 |
| | | | | 248/179.1 |
| 8,353,776 | B2* | 1/2013 | Zhang | F16C 11/0619 |
| | | | | 403/122 |
| 8,662,432 | B2 | 3/2014 | Smith et al. | |
| 9,182,153 | B2* | 11/2015 | Moore | F24J 2/54 |
| 9,296,271 | B2* | 3/2016 | Mevorach | B60G 7/005 |
| 9,416,518 | B2* | 8/2016 | Ditzler | E02F 9/006 |
| 2006/0251471 | A1* | 11/2006 | Chen | B60Q 1/076 |
| | | | | 403/122 |
| 2007/0003360 | A1* | 1/2007 | Ditzler | E02F 9/006 |
| | | | | 403/31 |
| 2008/0019766 | A1* | 1/2008 | Flaim | F16C 11/0666 |
| | | | | 403/122 |
| 2013/0020443 | A1* | 1/2013 | Dyckrup | F16C 11/0604 |
| | | | | 244/213 |
| 2013/0022388 | A1* | 1/2013 | Carli | B62D 7/18 |
| | | | | 403/39 |
| 2013/0140475 | A1* | 6/2013 | Burgess | F16K 31/088 |
| | | | | 251/65 |
| 2013/0302083 | A1* | 11/2013 | Matignon | F16C 11/06 |
| | | | | 403/122 |

* cited by examiner

US 10,577,774 B2

TRUNNION AND SOCKET ASSEMBLY

TECHNICAL FIELD

The present disclosure relates to a trunnion and socket assembly.

BACKGROUND

A trunnion and socket joint (also known as a ball and socket joint) can be utilized for operating a blade of a machine, such as bulldozers, motor graders, among others. The trunnion and socket joint allows pivotal movement of the blade for carrying out various operations, such as pushing rocks or earthen material. The pivotal movement enables the blade to be adjusted for pitch, angle, and tilt using hydraulic cylinders.

Split caps may be used to retain a trunnion within a socket. The split caps are secured to the structure surrounding the socket using fasteners, such as bolts. During operation, the trunnion may press against the split caps, causing them to be pushed away from each other. As a result, there are chances of wear to the fasteners or the split caps.

Conventionally, retention mechanisms are known that utilize a ring to retain a ball within a socket. In such mechanisms, an inner diameter (ID) of the ring is smaller than an outer diameter (OD) of the ball so that the ring retains the ball within the socket.

SUMMARY OF THE DISCLOSURE

In one aspect of the present disclosure, a trunnion and socket assembly is provided. The trunnion and socket assembly includes a trunnion, a socket, and a retention assembly. The trunnion includes a first portion and a second portion. The second portion defines an outer diameter. The socket has a cavity formed therein. The trunnion is adapted to be received into the cavity. The socket has a first surface defining a plurality of first apertures in a spaced apart arrangement from each other. The retention assembly retains the trunnion in the socket. The retention assembly includes at least two cap elements and a ring member. The at least two cap elements are adapted to be coupled in an abutting relationship with the first surface of the socket. Each of the at least two cap elements has a second surface and a third surface defining a plurality of second apertures therethrough in a spaced apart arrangement from each other. The ring member is adapted to be coupled in an abutting relationship with the third surface of each of the at least two cap elements. The ring member has a fourth surface and a fifth surface defining a plurality of third apertures therethrough in a spaced apart arrangement from each other. The ring member defines an inner diameter such that the inner diameter of the ring member is greater than the outer diameter of the second portion of the trunnion. The plurality of third apertures of the ring member, the plurality of second apertures of each of the at least two cap elements, and the plurality of first apertures of the socket are adapted to be aligned with each other to receive mechanical fasteners therethrough.

Other features and aspects of this disclosure will be apparent from the following description and the accompanying drawings.

DETAILED DESCRIPTION

Figure 1:
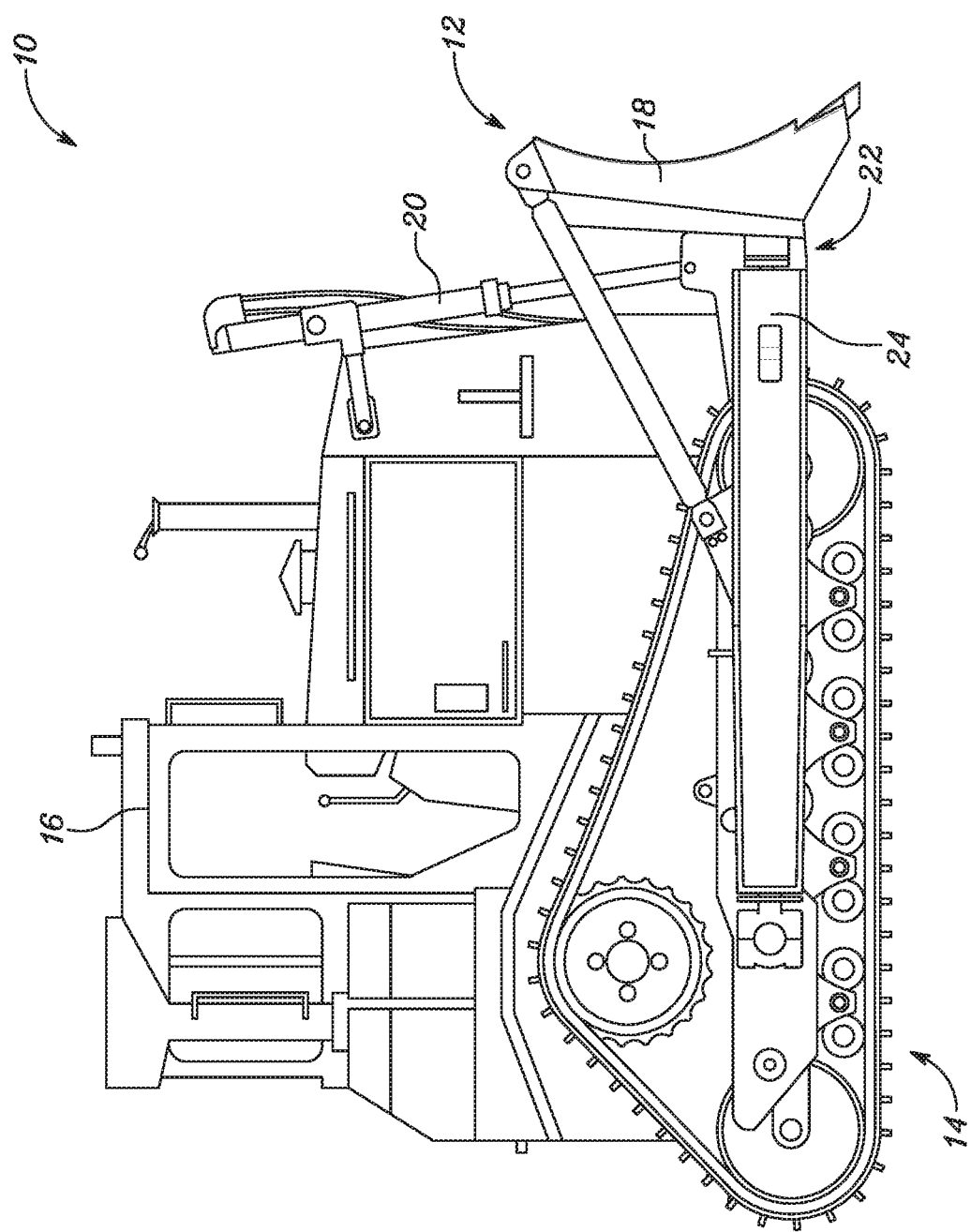
FIG. 1 is a side view of an exemplary machine, in accordance with the concepts of the present disclosure.

Referring to FIG. 1, an exemplary machine 10 is illustrated. The machine 10 is a bulldozer. The machine 10 includes a blade assembly 12, an undercarriage 14, and an operator's cabin 16. The machine 10 is used to move material for various purposes, e.g., shape terrain to desired contours, remove overburden to expose ore, and the like. The blade assembly 12 includes a blade 18, hydraulic cylinders 20, and a trunnion and socket assembly 22. The trunnion and socket assembly 22 connects the blade 18 of the blade assembly 12 to a frame 24 to provide pivotal movement of the blade 18 relative to the frame 24.

The trunnion and socket assembly 22 of the present disclosure may be utilized in various other machines, not limited to the machine 10, in accordance with the concepts of the present disclosure. Examples of such machine 10 include mobile or fixed machines used for construction, farming, mining, forestry, transportation, and other similar industries. Accordingly, the machine 10 may be an excavator, wheel loader, backhoe, crane, compactor, dozer, or any other suitable machine.

Figure 2:
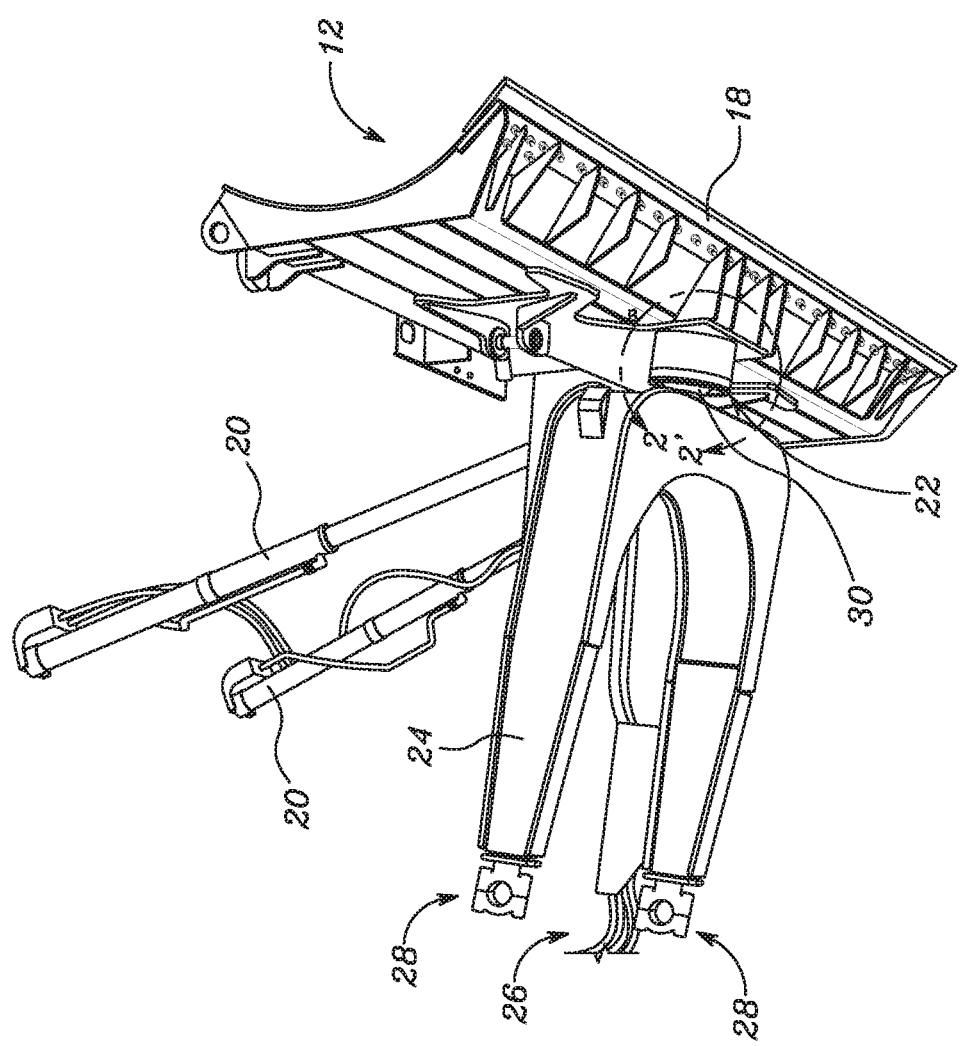
FIG. 2 is a perspective view of a blade assembly having a trunnion and socket assembly.

Referring to FIG. 2, the blade assembly 12 also includes multiple hoses 26 and mounting members 28. The hoses 26 are coupled with the hydraulic cylinders 20 for providing fluid pressure to the hydraulic cylinders 20. The mounting members 28 are utilized to mount the blade assembly 12 to the machine 10.

Figure 3:
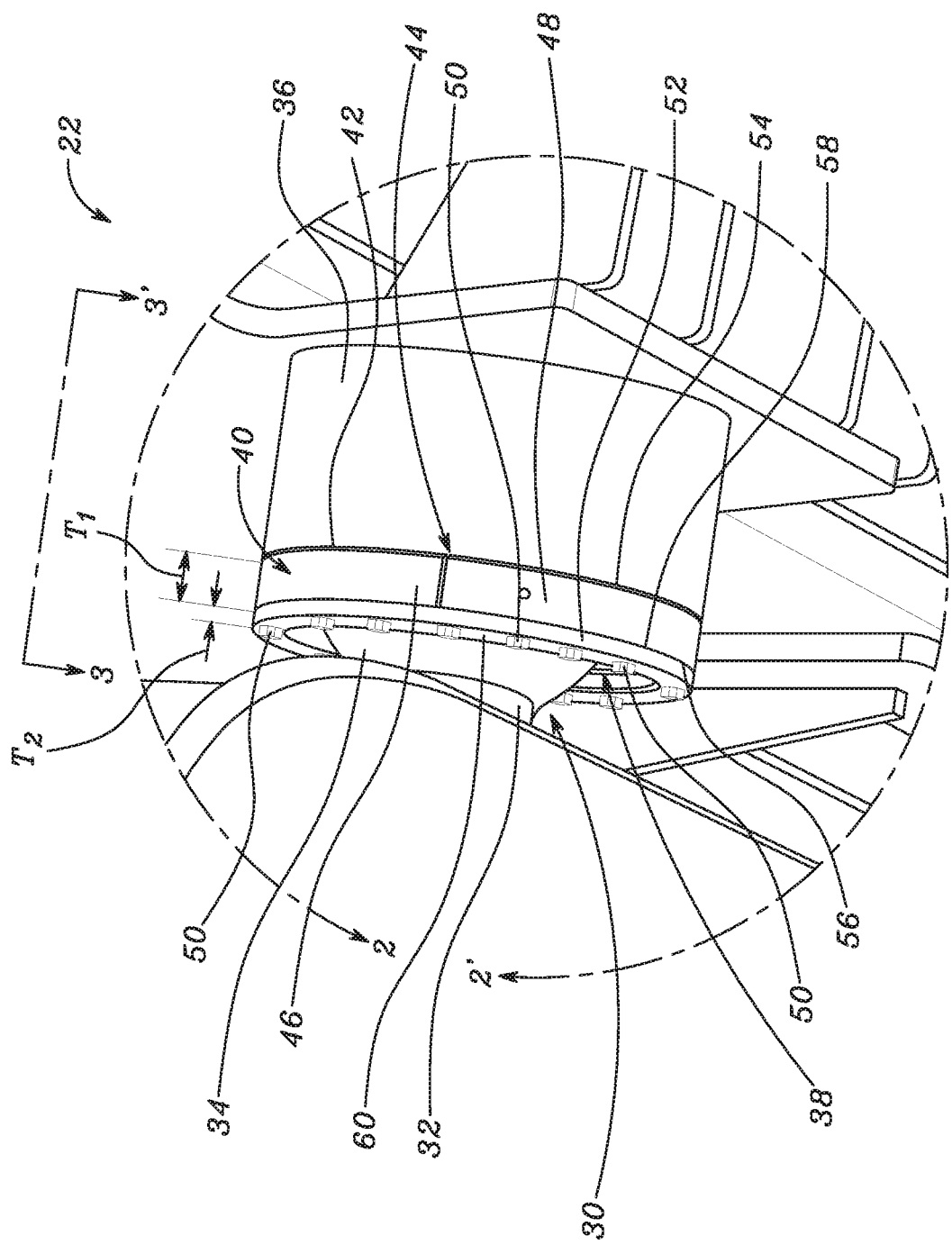
FIG. 3 is an enlarged perspective view of a portion of FIG. 2 (encircled between 2-2') and showing additional details of the trunnion and socket assembly.
Figure 4:
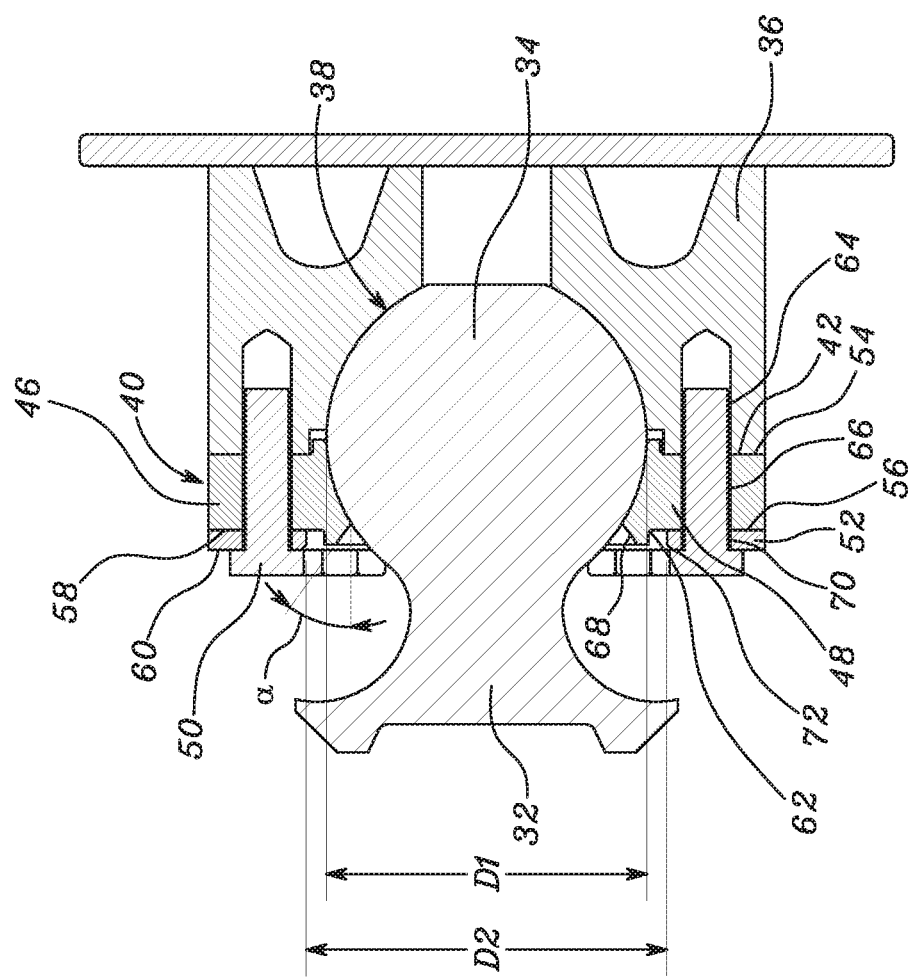
FIG. 4 is a sectional view of the trunnion and socket assembly taken along a section line 3-3' as shown in FIGS. 3.
Figure 5:
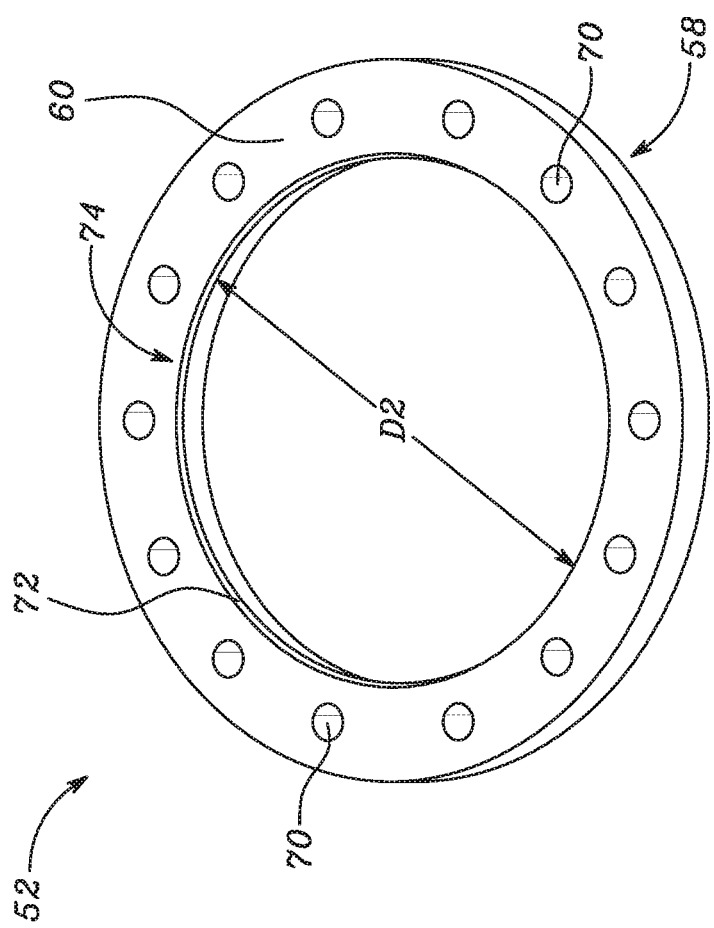
FIG. 5 is a perspective view of the ring member of the trunnion and socket assembly.

The trunnion and socket assembly 22 includes a trunnion 30 which is a substantially ball-shaped structure that is secured to the frame 24. Referring to FIGS. 3, 4 and 5, the trunnion 30 has a first portion 32 and a second portion 34. The second portion 34 defines an outer diameter 'D1' (see FIG. 4).

The trunnion and socket assembly 22 also includes a socket 36, and a retention assembly 40 for retaining the trunnion 30 in the socket 36. The socket 36 includes a cavity 38 that is adapted to receive the trunnion 30. The cavity 38 is adapted to receive the second portion 34 of the trunnion 30. The cavity 38 defines a volume that is sufficient to accommodate the trunnion 30. The cavity 38 also facilitates free movement of the trunnion 30 within the socket 36.

The socket 36 has a first surface 42 that includes multiple first apertures 64 (see FIG. 4) in a spaced apart arrangement from each other. The first apertures 64 extend from the first surface 42 to a depth within the socket 36 for receiving fasteners 50. The fasteners 50 may include, but are not limited to, bolts and rivets. In the accompanying figures, there are fourteen first apertures 64. Alternatively, the number of first apertures 64 provided on the socket 36 may vary. Also, the first apertures 64 may vary in size and shape based on the design. The first apertures 64 are provided with threads to allow tightening of the fasteners 50. The first apertures 64 may be arranged on the first surface 42 or in the socket 36 in any other orientation and manner based on the application. The socket 36 is manufactured from a material such as hardened steel. Alternatively, the socket 36 may be made of any other suitable material.

The retention assembly 40 includes a cap assembly 44 having two or more cap elements. In the illustrated embodiment, the cap assembly 44 has two cap elements: a first cap element 46 and a second cap element 48. In other embodiments, the cap assembly 44 may include more than two cap elements. The retention assembly 40 further includes a ring member 52. The first cap element 46 and the second cap element 48 are adapted to be coupled in an abutting relationship with the first surface 42 of the socket 36.

Each of the first cap element 46 and the second cap element 48 includes a second surface 54 and a third surface 56. The second surface 54 and the third surface 56 are parallel to each other and define a thickness 'T1' therebetween. The first cap element 46 and the second cap element 48 have a curved configuration. Alternatively, the first cap element 46 and the second cap element 48 may have any other shape and thickness based on the application. Each of the first cap element 46 and the second cap element 48 includes second apertures 66 in a spaced apart arrangement from each other. The second apertures 66 extend between the second surface 54 and the third surface 56 of each of the first cap element 46 and the second cap element 48 for receiving the fasteners 50. In the accompanying figures, the cap assembly 44 has fourteen second apertures 66. More particularly, each of the first cap element 46 and the second cap element 48 includes seven second apertures 66. The second apertures 66 may vary in size and shape based on the design.

Referring to FIG. 4, the first cap element 46 and the second cap element 48 have a flanged portion 68 provided on a first edge 62 of the respective first cap element 46 and the second cap element 48. The flanged portion 68 extends in a predetermined angular orientation a with respect to the second surface 54 and the third surface 56. The first cap element 46 and the second cap element 48 are manufactured from material such as hardened steels or any other suitable material.

The ring member 52 is adapted to be coupled in an abutting relationship with the third surface 56 of each of the first cap element 46 and the second cap element 48. The ring member 52 includes a fourth surface 58 and a fifth surface 60. The fourth surface 58 of the ring member 52 is in abutting relationship with the third surface 56 of each of the first cap element 46 and the second cap element 48. The fourth surface 58 and the fifth surface 60 are parallel to each other and define a thickness 'T2' therebetween. The ring member 52 defines third apertures 70 therethrough in a spaced apart arrangement from each other. The third apertures 70 extend between the fourth surface 58 and the fifth surface 60 of the ring member 52 for receiving the fasteners 50.

Referring to FIG. 4, the ring member 52 is positioned around the flanged portion 68 such that a central axis of the ring member 52 is aligned with a central axis of the flanged portion 68 A chamfer 72 (see FIG. 5) is provided on an inner circumference 74 (see FIG. 5) of the ring member 52. The chamfer 72 extends along an entire length of the inner circumference 74. In other embodiments, the chamfer 72 may extend along at least a portion of the length of the inner circumference 74 of the ring member 52. In the accompanying figures, the ring member 52 has fourteen third apertures 70. Alternatively, the number of third apertures 70 provided on the ring member 52 may vary corresponding to the number of apertures on the first and second cap elements 46, 48 and the socket 36. Also, the third apertures 70 may vary in size, shapes based on the application. The ring member 52 may have different shape and/or size according to the application. The ring member 52 is manufactured from material such as hardened steels or any other materials.

Referring to FIGS. 4 and 5, the ring member 52 defines an inner diameter 'D2' that is greater than the outer diameter 'D1' of the second portion 34 of the trunnion 30. The ring member 52 is coupled with each of the first cap element 46 and the second cap element 48 in such a way that the third apertures 70, the second apertures 66, and the first apertures 64 align with respect to each other. Therefore, the fasteners 50 pass through the third apertures 70, the second apertures 66, and the first apertures 64 in order to fasten the ring member 52 and the cap assembly 44 of the retention assembly 40 with the socket 36, thereby retaining the trunnion 30 in the socket 36.

INDUSTRIAL APPLICABILITY

The ring member 52 of the retention assembly 40 enables improved retention of the trunnion 30 within the cavity 38 of the socket 36. The ring member 52 stabilizes the forces by distributing the loads across the fasteners 50. Further, the ring member 52 holds the first and second cap elements 46, 48 of the cap assembly 44 together, resulting in the trunnion 30 being held within the cavity 38 efficiently. The ring member 52 may also reduce or prevent shear forces from acting upon the fasteners 50. The design and construction of the ring member 52 contributes to effective overall operation of the trunnion and socket assembly 22. The mating contact of the ring member 52 with the cap assembly 44 may offer durability to each of the first cap element 46 and the second cap element 48. The ring member 52 is a simple and economical means for providing reliability to the trunnion and socket assembly 22.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A trunnion and socket assembly, comprising:
   a trunnion having a first portion and a second portion, the second portion defining an outer diameter;
   a socket having a cavity formed therein, the trunnion being received in the cavity, the socket having a first surface defining a plurality of first apertures in a spaced apart arrangement from each other; and
   a retention assembly retaining the trunnion in the socket, the retention assembly including:
   at least two cap elements coupled in an abutting relationship with the first surface of the socket, each of the at least two cap elements having a second surface and a third surface defining a plurality of second apertures therethrough in a spaced apart arrangement from each other, the at least two cap elements being in a directly abutting relationship with the second portion of the trunnion, the at least two cap elements including a flanged portion; and
   a ring member coupled in an abutting relationship with the third surface of each of the at least two cap elements, the ring member having a fourth surface and a fifth surface defining a plurality of third apertures therethrough in a spaced apart arrangement from each other, wherein the ring member defines an inner diameter such that the inner diameter of the ring member is greater than the outer diameter of the second portion of the trunnion, and wherein the flanged portion includes a surface located between the fourth surface and the fifth surface relative to a longitudinal axis of the trunnion, wherein the plurality of third apertures of the ring member, the plurality of second apertures of each of the at least two cap elements, and the plurality of first apertures of the socket are aligned with each other to receive mechanical fasteners therethrough.

2. The assembly of claim 1, wherein the ring member defines an inner circumference, and wherein a chamfer extends along at least a portion of the inner circumference.

3. The assembly of claim 1, wherein each of the at least two cap elements have a semicircular configuration.

4. The assembly of claim 1, wherein the inner diameter of the ring member is greater than an inner diameter formed between the at least two cap elements.

5. The assembly of claim 1, wherein a thickness between the second surface and the third surface is greater than a thickness between the fourth surface and the fifth surface.

6. A trunnion and socket assembly, comprising:
a trunnion having a longitudinal axis, a first portion, and a second portion, the second portion defining an outer diameter;
a socket having a cavity formed therein, the trunnion being received in the cavity; and
a retention assembly retaining the trunnion in the socket, the retention assembly including:
at least two cap elements, each of the at least two cap elements having a first portion abutting with a surface of the socket and a second portion abutting with the second portion of the trunnion such that the trunnion is retained within the socket via the at least two cap elements; and
a ring member coupled in an abutting relationship with the first portion of each of the at least two cap elements via one or more fasteners extending therethrough, wherein the trunnion is in direct contact with the socket at a position radially inward of a flanged portion of the at least two cap elements.

7. The assembly of claim 6, wherein the ring member encircles the second portion of each of the at least two cap elements.

8. The assembly of claim 6, wherein the socket includes a first plurality of apertures, the at least two cap elements include a second plurality of apertures, and the ring member includes a third plurality of apertures; and wherein each of the first plurality of apertures, the second plurality of apertures, and the third plurality of apertures are circumferentially aligned relative to the longitudinal axis of the trunnion.

9. The assembly of claim 6, wherein the at least two cap elements define a first thickness along the longitudinal axis of the trunnion, wherein the ring member defines a second thickness along the longitudinal axis of the trunnion, and wherein the first thickness is greater than the second thickness.

10. The assembly of claim 6, wherein the inner diameter of the ring member is greater than an inner diameter formed between the at least two cap elements.

11. The assembly of claim 6, wherein the at least two cap elements have a semicircular configuration.

12. The assembly of claim 6, wherein the ring member defines an inner circumference, and wherein a chamfer extends along at least a portion of the inner circumference.

13. The assembly of claim 6, wherein the flanged portion is in direct contact with the outer diameter of the second portion of the trunnion.

14. A trunnion and socket assembly, comprising:
a trunnion having a longitudinal axis, a first portion, and a second portion, the second portion having an outermost diameter relative to the longitudinal axis of the trunnion;
a socket having a cavity formed therein, the trunnion being received in the cavity, the socket having a first surface defining a plurality of first apertures; and
a retention assembly retaining the trunnion in the socket, the retention assembly including:
at least two cap elements coupled in an abutting relationship with the first surface of the socket, each of the at least two cap elements including a plurality of second apertures extending therethrough and a curved surface mating with the second portion of the trunnion and having an innermost diameter relative to the longitudinal axis of the trunnion, wherein the innermost diameter of the at least two cap elements is less than the outermost diameter of the second portion of the trunnion; and
a ring member coupled in an abutting relationship with each of the at least two cap elements, the ring member including a plurality of third apertures and an inner diameter relative to the longitudinal axis of the trunnion, wherein the inner diameter of the ring member is greater than the outermost diameter of the second portion of the trunnion.

15. The assembly of claim 14, wherein each of the at least two cap elements have a semicircular configuration.

16. The assembly of claim 14, wherein each of the at least two cap elements include a flanged portion.

17. The assembly of claim 14, wherein the ring member includes a chamfer along an inner circumference thereof.

18. The assembly of claim 14, wherein the at least two cap elements define a first thickness along the longitudinal axis of the trunnion, the ring member defines a second thickness along the longitudinal axis of the trunnion, and wherein the first thickness is greater than the second thickness.

19. The assembly of claim 14, wherein each of the first plurality of apertures, the second plurality of apertures, and the third plurality of apertures are circumferentially aligned relative to the longitudinal axis of the trunnion.

20. The assembly of claim 14, wherein the trunnion is in direct contact with the socket at a position radially inward of a flanged portion of the at least two cap elements.

* * * * *